United States Patent [19]
Odom et al.

[11] Patent Number: 5,656,047
[45] Date of Patent: Aug. 12, 1997

[54] WET GAS SCRUBBER

[75] Inventors: Horace L. Odom; Kenneth A. Odom, both of Richmond, Va.

[73] Assignee: Product Engineered Systems, Inc., Richmond, Va.

[21] Appl. No.: 425,059

[22] Filed: Apr. 19, 1995

[51] Int. Cl.$^6$ .................................................... B01D 45/00
[52] U.S. Cl. ........................... 55/227; 55/238; 55/257.4; 55/355; 55/457; 96/216
[58] Field of Search ............................. 55/235, 237, 238, 55/227, 257.4, 274, 355, 457; 96/181, 191, 208, 209, 212, 216

[56] References Cited

U.S. PATENT DOCUMENTS

| | | |
|---|---|---|
| 844,312 | 2/1907 | Bachman . |
| 1,107,986 | 8/1914 | Muller et al. ............................. 55/238 |
| 1,116,647 | 11/1914 | Thurber ..................................... 55/237 |
| 1,304,884 | 5/1919 | Kawai . |
| 1,804,554 | 5/1931 | Dubbs ......................................... 55/457 |
| 2,230,453 | 2/1941 | Fitch . |
| 2,271,642 | 2/1942 | Holzwarth ................................. 55/237 |
| 2,509,817 | 5/1950 | Foreman . |
| 2,698,672 | 1/1955 | Burnside et al. ........................... 55/457 |
| 3,358,413 | 12/1967 | Kalika ........................................ 55/230 |
| 3,538,684 | 11/1970 | Esterhoy, Jr. et al. .................... 55/238 |
| 3,582,051 | 6/1971 | Klein ......................................... 261/79 |
| 3,696,590 | 10/1972 | Richmond ................................. 55/238 |
| 3,800,513 | 4/1974 | Lappin ....................................... 55/238 |
| 3,969,093 | 7/1976 | Murray, Jr. ................................ 55/355 |
| 3,989,488 | 11/1976 | Wisting ...................................... 55/238 |
| 3,990,870 | 11/1976 | Miczek ...................................... 55/238 |
| 4,073,631 | 2/1978 | Brady et al. . |
| 4,179,273 | 12/1979 | Montusi ..................................... 55/457 |
| 4,478,216 | 10/1984 | Dukowski ............................ 128/204.21 |
| 4,594,082 | 6/1986 | Catherwood, Sr. . |
| 4,878,926 | 11/1989 | Goodrich ................................... 55/294 |
| 4,999,036 | 3/1991 | Hwang et al. ............................. 55/317 |
| 5,067,974 | 11/1991 | Chang ........................................ 55/223 |
| 5,094,676 | 3/1992 | Karbacher . |
| 5,173,987 | 12/1992 | Buckingham ............................. 15/301 |
| 5,178,656 | 1/1993 | Schott ........................................ 55/457 |
| 5,373,615 | 12/1994 | Webb et al. ............................. 29/163.8 |
| 5,531,811 | 7/1996 | Kloberdanz .............................. 96/208 |

FOREIGN PATENT DOCUMENTS

| | | |
|---|---|---|
| 907544 | 8/1972 | Canada . |
| 2583658 | 12/1986 | France ....................................... 55/238 |
| 1081424 | 5/1960 | Germany ................................... 55/238 |
| 2013007 | 9/1971 | Germany . |
| 42854 | 1/1908 | Switzerland . |
| 1692619 | 11/1991 | U.S.S.R. .................................... 55/238 |
| 2008077 | 2/1994 | U.S.S.R. .................................... 55/238 |
| 359739 | 10/1931 | United Kingdom ..................... 55/238 |

Primary Examiner—C. Scott Bushey
Attorney, Agent, or Firm—Millen, White, Zelano & Branigan, P.C.

[57] ABSTRACT

An improved wet scrubber for removing airborne particulates and absorbing water-soluble gases from an airstream includes an outer shell and a continuous spiral flight within the outer shell. A first bank of scrubber nozzles spray water and/or chemical through the airstream as it enters the scrubber through an air intake. The airstream increases in velocity as it moves through the tapered helix formed by the continuous spiral flight. A second bank of scrubber nozzles mounted on a sidewall of the outer shell sprays water and/or chemical through the airstream as it moves up the spiral flight. An inner shell provides a downward path for the airstream after it has ascended the spiral flight and traversed an abrupt direction change in which water/chemical precipitates from the airstream. The inner shell extends downward into a reservoir, forming a seal with precipitated water that has collected there. An air discharge deflection cone provides an upward path for the airstream after it has traversed a second abrupt direction change. The air is discharged through an air outlet above the air discharge deflection cone. A monitoring system maintains the water level within the reservoir.

15 Claims, 2 Drawing Sheets

WET GAS SCRUBBER

BACKGROUND OF THE INVENTION

1. Field of the Invention

The invention relates in general to devices for removing contaminants from a gas, such as air, and in particular to an improved wet scrubber filtration device.

2. Related Art

In industries where plant operations yield high levels of gaseous and/or particulate contaminants, air scrubbers have been known for reducing or removing such pollutants from an airstream prior to release of the airstream into an internal or external atmosphere. Such industries include, e.g., the tobacco processing industry, chemical plants, bakeries, and hotels. Air scrubbers have also been used to remove pollutants from airstreams that are produced by furnaces, incinerators, other systems which utilize combustion, and the like.

Wet air scrubbers, which spray liquid into the airstream as part of the cleansing process, have seen especially wide use due to their ability to remove very fine particulates and gases from the airstream. Such wet air scrubbers typically utilize one or more spray nozzles to spray water and/or neutralizing chemicals into the air stream and then impart a rotational swirling action to the air stream in order to precipitate the liquid back out after it has absorbed contaminants. However, wet air scrubbers of the prior art have suffered from several drawbacks, including inefficiency, a tendency to become clogged with contaminants, high costs of manufacturing and maintenance, and unacceptably high levels of particulate emission through exhaust air and water vapor. Further, wet air scrubbers often emit large quantities of water mist and require complex and expensive mist-eliminator devices for peak operation.

OBJECTS AND SUMMARY OF THE INVENTION

It is therefore an object of the invention to provide an improved wet scrubber for removal of contaminants from a gas, such as air.

It is a further object of the invention to provide a wet scrubber having decreased levels of particulate emission.

It is a further object of the invention to provide a device which incorporates a high-velocity airstream and a high-pressure water spray to precipitate airborne particulates and absorb water-soluble gases from the airstream.

The invention according to a preferred embodiment provides a wet scrubber including an outer shell surrounding a continuous spiral flight. A first bank of scrubber nozzles spray water and/or neutralizing chemicals through an airstream as it enters the scrubber through an air intake, causing small particulates to precipitate via formation of water droplets and fall into a reservoir 13. The continuous spiral flight, in conjunction with the outer shell and an inner shell, forms a tapered helix through which the airstream flows with increasing velocity. The increasing velocity causes water particles to be precipitated and slung to the interior walls of the outer shell.

A second bank of scrubber nozzles mounted on a sidewall of the outer shell further saturates the airstream as it moves up the spiral flight, thereby precipitating gases, odors, and chemicals from the airstream. After the air/chemical flow has ascended the spiral flight, it traverses an abrupt direction change, heading downwardly into an interior portion of the inner shell. The abrupt direction change causes further precipitation to be slung against inner walls. As the air and precipitated liquid reach the bottom of an air discharge deflection cone, the air traverses a second abrupt direction change, travelling up into the cone, while the water, due to its increased momentum, continues down through the inner shell. The inner shell extends downwardly into a reservoir, forming a seal with collected precipitate. Air is discharged through an air outlet above the air discharge deflection cone. A monitoring system is provided for maintaining the water level within the reservoir.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION OF THE INVENTION

Figure 1:
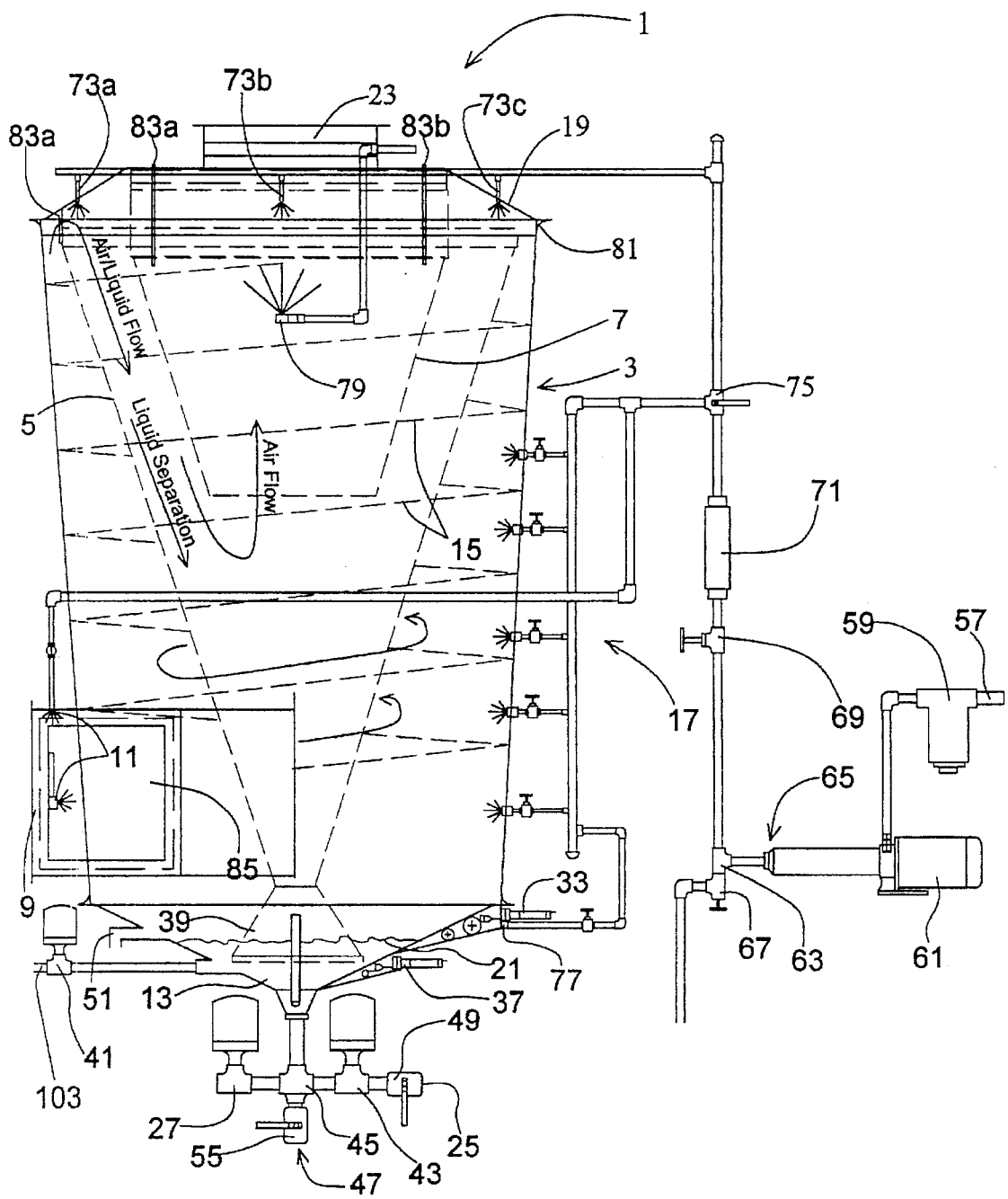
FIG. 1 illustrates a schematic front elevational view of the wet scrubber according to a preferred embodiment of the invention.

As illustrated in FIG. 1, an improved wet scrubber 1 is provided for removing airborne particulates and absorbing water-soluble gases from an airstream. The wet scrubber 1 according to a preferred embodiment comprises an outer shell 3, a continuous spiral flight 15, an inner shell 5, an air discharge deflection cone 7, air intake 9, air outlet 23, water discharge 25, 45, 27, and water overflow/skimmer drain 51. The air intake 9 is a square flanged opening in a sidewall of the outer shell 3 and is preferably constructed of 14-gauge type 304 stainless steel. The air intake 9 has mounted therein a first bank of scrubber nozzles 11. The air outlet 23 is preferably constructed of 14-gauge type 304 stainless steel with stainless steel angle flanges on each end; one flange connects the outlet 23 to a dome-shaped top 19 and the other flange connects to an external duct system. A Lexan door 85 is provided for purposes of facilitating interior inspection.

Inside the outer shell 3 is the continuous spiral flight 15 which forms a helix through which an airstream flows. The spiral flight 15 is preferably constructed of a series of 14-gauge stainless steel pieces which are welded to the interior wall of the outer shell 3. A second bank of scrubber nozzles 17 is mounted on a sidewall of the outer shell 3 for spraying liquid through the airstream as it moves up the spiral flight 15. All scrubber nozzles are preferably of type 316 stainless steel and comprise a flow-control valve for individual flow adjustment.

The dome-shaped top 19 is fastened to the top side of the outer shell 3. The top 19 may be constructed of 14-gauge type 304 stainless steel with a ¼"×2" stainless steel bar flange welded to the bottom. For larger units, heavier gauges of steel may be preferable. The cone-shaped inner shell 5 is suspended from the dome-shaped top 19 and comprises a reversely-directed cone 39 which extends below a low-water level 21, forming an air seal. This seal prevents air entering the intake 9 from flowing directly to the interior of the inner shell 5 without first traversing the spiral flight 15. The cone-shaped inner shell 5, by virtue of the taper between its lower end and its upper end, gradually reduces the cross-sectional area of the helical path between the lower end and the upper end of the spiral flight 15.

The outer shell 3 preferably takes the general shape of a truncated cone, having a small taper between its smaller-diameter bottom portion and its larger-diameter top portion. The outer shell 3 is preferably constructed of 14-gauge type 304 stainless steel with 2"×2"×¼" stainless steel angle flanges 81 at the top and bottom. Fastened to the small end of the outer shell 3 is the reservoir 13, which collects precipitate, such as water. The reservoir 13 is preferably constructed of 14-gauge type 304 stainless steel and has a ¼"×2" stainless steel flat bar flange welded to its top.

The air-discharge deflection cone 7 is attached to the dome-shaped top 19 via adjustment bolts 83a, 83b, which can be adjusted to affect slight changes in air velocity through the cone 7. Further adjustment bolts may be provided as needed. Both the inner shell 5 and the air-discharge deflection cone 7 are preferably constructed of 16-gauge type 304 stainless steel.

Air and/or gases containing particulate matter enter the air intake 9 and are met with a flood of water and/or neutralizing chemical particles from the first bank of scrubber nozzles 11. Small particulates precipitate via formation of water droplets and fall into the reservoir 13. The air/gas continues forward and begins an upward spiral through the helix and past the second bank of scrubber nozzles 17. As the air initially enters the spiral, its velocity is relatively low, e.g., 2000 FPM. Gases are absorbed by the water mist and continue the upward spiral path. The narrowing cross-sectional shape of the helix formed by the spiral flight 15 and the outer and inner shells 3, 5 causes the air/gas to increase in velocity (to approximately 4,000 FPM) and momentum as it moves upwardly through the helix. The increasing velocity and momentum cause water particles to be slung to the interior walls of the outer shell 3 and drop out into the reservoir 13.

As the air/gas and liquid mixture reaches the top of the inner shell 5 its velocity peaks and it changes direction by one-hundred and eighty degrees and heads downwardly into the inner shell 5. This velocity peak and abrupt direction change cause more water droplets to form. As the air/gas and liquid reach the bottom of the air discharge deflection cone 7, the air/gas takes another abrupt turn upwardly into the air discharge deflection cone 7. Mist and liquid droplets, by virtue of their increased momentum and weight, separate and continue downward through a relatively stagnant zone 91 toward the bottom of the inner shell 5. This separation eliminates the need for a mist-eliminator device in the wet scrubber. Liquid droplets also collect on the interior walls of the inner shell 5 and drop downwardly into the reservoir 13. The relatively stagnant zone 91, which is caused by the air seal at the water line 21, prevents liquid drop-out from regenerating itself into the air stream.

Figure 2:
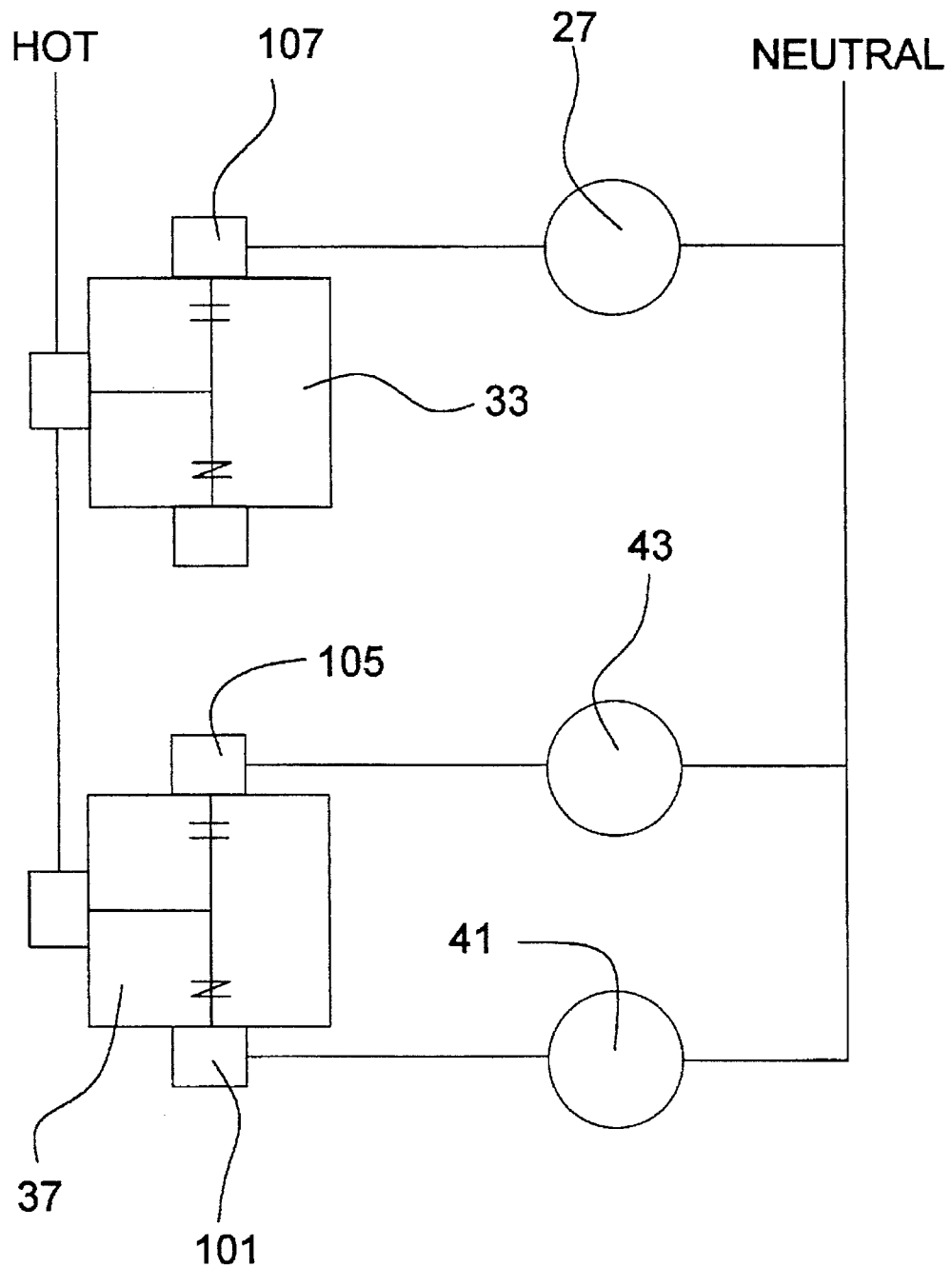
FIG. 2 is a schematic block diagram of electrical portions of the invention according to a preferred embodiment.

For optimum operation of the scrubber, it is important that the water level 21 in the reservoir 13 be maintained within certain upper and lower limits. With reference to FIGS. 1 and 2, when power is applied to the system with the reservoir 13 empty, the normally-closed contacts 101 of an SPDT low-water-level float switch 37 are closed and power is thereby sent to a fall solenoid valve 41, causing the fill solenoid valve 41 to open. It will be understood by those skilled in the art that other known valves could be substituted for the solenoid valves described herein without departing from the spirit and scope of the invention. Other known valve types include, e.g., pilot-operated ball valves. The fill solenoid valve 41, which is connected to a water supply 103, fills the reservoir 13 to a point at which the float in float switch 37 is activated. Activation of the float switch 37 opens its normally-closed contacts 101, thus closing fill solenoid valve 41 and turning off the fill water.

Activation of the switch 37 also causes it to dose its normally-open contacts 105, thereby energizing a level-control solenoid valve 43. The level-control solenoid valve 43 is connected via a cross tee 45 to a drain 47. The level-control solenoid 43, now energized, opens and drains off sediment water at a metered rate which is less than the rate at which water is being sprayed by the nozzles throughout the system. Metering is accomplished via a ball valve 49 downstream of the level-control solenoid valve 43.

It will be understood by those skilled in the art that other known switching means could be substituted for the float switches described herein without departing from the spirit and scope of the invention. Other known switching means which could be substituted include, e.g., a sight glass gage with a detector thereon for detecting water level.

During normal operation, the water level 21 rises to an overflow/skimmer drain 51, which serves to drain off excess water and floating matter. In the event that the overflow/skimmer drain becomes clogged, the water level 21 would rise to the point at which a high-water-level float switch 33 is activated. Activation of the high-water-level float switch 33 causes its normally-open contacts 107 to close, thereby sending power to a high-water-dump solenoid valve 27. An alarm can be provided to alert an operator upon activation of the float switch 33. The high-water-dump solenoid valve 27 remains open until the float in the high-water-level float switch 33 returns to a normal operating height. The water level 21 is monitored by a liquid level gauge 53 mounted on the reservoir 13.

A ball valve 55 connected to a drain 47 is provided for regularly-scheduled maintenance. During normal operation, the ball valve 55 is closed; after heavy usage of the scrubber, the ball valve 55 can be opened to allow large, heavy particles to be drained off to prevent clogging of a solenoid valve. An agitation nozzle 77 is provided on the reservoir 13 for imparting a swirling action to the water in the reservoir. This swirling action prevents buildup of sedimentary deposits in the reservoir 13.

A main water supply 57 is connected to a water filter 59 located upstream of a multi-stage centrifugal pressure booster pump 61. A cross tee 63 is connected to the discharge end 65 of the pump 61. On one side of the cross tee 63 is a pressure-relief valve 67, and on the other side of the tee is a flow-control metering valve 69 for fluid regulation. A rotameter 71 is provided for controlling, via a needle valve, the flow rate of high-pressure water flowing to therethrough.

As is set forth above, the water sprayed from the scrubber nozzles may have therein certain chemicals. For example, the water sprayed may have therein detergents, fragrences, and/or neutralizing chemicals. The particular neutralizing chemical used will depend upon, e.g., the pollutant which is being scrubbed from the airstream. Examples of chemicals which may be used include, but are not limited to, flourine, alluminum potassium sulfate, ammonium bicarbinate, ammonium chloride, barium chloride, calcium carbonate, calcium chloride, calcium hydroxide, lead sulfate, magnesium chloride, magnesium hydroxide, magnesium sulphate, potassium carbonate, potassium chloride, potassium hydroxide, potassium nitrate, potassium sulfate, sodium bicarbonate, sodium carbinate, sodium chloride, sodium hydroxide, and sodium nitrate.

A three-way directional ball valve 75 is provided for selecting between a scrubbing mode and a wash-down mode. Although a manual valve is shown, a solenoid-operated valve may be used if further automation is desired. When the valve 75 is in the "scrubbing" position, high-pressure water is diverted to the scrubber nozzles 11, 17, and agitation nozzle 77 for normal air scrubbing operation. During air scrubbing, the water pressure to the scrubber nozzles 11, 17 and to agitation nozzle 77 can be monitored via the rotameter 71.

When the valve 75 is in a "wash-down" position, high-pressure water is diverted to a bank of wash-down nozzles 73a, 73b, 73c located around the perimeter of the dome-shaped top 19 and to a single wash-down nozzle 79 in the center of the air discharge defection cone 7. A wash-down nozzle may also be provided to spray the Lexan door 85. The spray from the wash-down nozzles, which is preferably provided at high pressures of about 200 to 275 PSI or above, blasts deposits from internal parts of the air scrubber 1. To facilitate wash-down operations, a spray nozzle may be provided near each of the float switches 33, 37 for continual cleaning of the switch environment. Wash-down operations are preferably performed at a time when air velocity through the scrubber is essentially zero, i.e., when the scrubber is not in service.

The wet scrubber of the invention is a highly compact unit that is preferably used upstream from an air mover which supplies a negative air flow through the device. However, the device can also be used in a positive flow system. The device is preferably used in combination with a dry scrubber as part of a two-stage filtration system. The wet scrubber of the invention provides a low pressure loss of approximately 8 inches of water PSI, thereby providing low horsepower requirements for moving air through the scrubber.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. A wet gas scrubber for removing contaminants from a gas, comprising:

an outer shell for defining an enclosed area;

gas intake means including a port through said outer shell for receiving a flow of gas and directing said flow of gas into said enclosed area;

spiral flight means within said outer shell for defining a helical path through which said flow of gas is directed, said helical path having a first portion through which said gas flow enters and a second portion through which said gas flow exits;

spray means for spraying liquid into said flow of gas;

means for reducing the cross-sectional area of said helical path at said second portion with respect to said first potion, whereby an acceleration is imparted to said flow of gas during a traversal from said first portion to said second portion; and, gas discharge defection cone means within said outer shell for causing an abrupt change of direction of said flow of gas, whereby said liquid is caused to separate from said flow of gas and to drop through a reversely-directed cone into a liquid reservoir.

2. The wet gas scrubber according to claim 1, wherein said means for reducing the cross-sectional area comprises a tapered inner shell extending axially within said spiral flight, said tapered inner shell having a first extremity with a first diameter and a second extremity with a second, larger diameter.

3. The wet gas scrubber according to claim 2, wherein said first extremity of said tapered inner shell extends downward into portions of said liquid that have precipitated and collected in a collecting means, whereby a seal is created at said first extremity between an interior of said tapered inner shell and an exterior of said tapered inner shell.

4. The wet gas scrubber according to claim 1, wherein said spray means comprises a bank of scrubber nozzles, each of said scrubber nozzles being located such that its spray is directed into said flow of gas as said flow of gas traverses said helical path.

5. The wet gas scrubber according to claim 1, wherein said spray means comprises at least one scrubber nozzle located in said gas intake.

6. A wet gas scrubber for removing contaminants from a gas, comprising:

an outer shell for defining an enclosed area;

gas intake means including a port through said outer shell for receiving a flow of gas and directing said flow of gas into said enclosed area;

spray means for spraying liquid into said flow of gas;

means for precipitating at least portions of said liquid from said flow of gas;

means for collecting said precipitated portions of liquid; and, inner shell means within said outer shell, said inner shell comprising a lower end which extends downward into said portions of liquid collected in said collecting means, whereby a seal is created at said lower end between an interior of said inner shell and an exterior of said inner shell.

7. The wet gas scrubber according to claim 6, further comprising:

means for regulating a level of said portions of liquid collected in said collecting means.

8. The wet gas scrubber according to claim 7, wherein said means for regulating comprises at least one level switch and at least one solenoid valve.

9. The wet gas scrubber according to claim 7, wherein said means for regulating comprises an overflow drain.

10. The wet gas scrubber according to claim 6, wherein said means for precipitating comprises:

spiral flight means within said outer shell for defining a helical path through which said flow of gas is directed, said helical path having a first portion through which said gas flow enters and a second portion through which said gas flow exits.

11. The wet gas scrubber according to claim 10, further comprising:

means for reducing the cross-sectional area of said helical path at said second portion with respect to said first portion, whereby an acceleration is imparted to said flow of gas during a traversal from said first portion to said second portion.

12. The wet gas scrubber according to claim 11, wherein said means for reducing the cross-sectional area comprises a tapered wall of said inner shell.

13. The wet gas scrubber according to claim 6, wherein said spray means comprises a bank of scrubber nozzles, each of said scrubber nozzles being located such that its spray is directed into said flow of gas as said flow of gas traverses a helical path.

14. The wet gas scrubber according to claim 6, wherein said spray means comprises at least one scrubber nozzle located adjacent said gas intake.

15. A wet gas scrubber for removing contaminants from a gas, comprising:

an outer shell for defining an enclosed area;

gas intake means including a port through said outer shell for receiving a flow of gas and directing said flow of gas into said enclosed area;

spiral flight means within said outer shell for defining a helical path through which said flow of gas is directed, said helical path having a first portion through which said gas flow enters and a second portion through which said gas flow exits;

spray means comprising a bank of scrubber nozzles, each of said scrubber nozzles being located such that its spray is directed into said flow of gas as said flow of gas traverses said helical path;

a tapered inner shell extending axially within said spiral flight, said tapered inner shell having a first extremity with a first diameter and a second extremity with a second, larger diameter, said tapered inner shell extending downward into liquid that has precipitated and collected in a collecting means, whereby a seal is created at said first extremity between an interior of said tapered inner shell and an exterior of said tapered inner shell; and, a stagnant zone between said spiral flight means and said collecting means for preventing said liquid from reentraining itself into said flow of gas after separating from said flow of gas.

* * * * *